(12) United States Patent
Saputo

(10) Patent No.: US 6,214,142 B1
(45) Date of Patent: Apr. 10, 2001

(54) METHOD OF MAKING SKATEBOARD DECK

(76) Inventor: Frank M. Saputo, 6307 Camino Corto, San Diego, CA (US) 92120

( * ) Notice: Subject to any disclaimer, the term of this patent is extended or adjusted under 35 U.S.C. 154(b) by 0 days.

(21) Appl. No.: 09/333,586

(22) Filed: Jun. 15, 1999

(51) Int. Cl.⁷ .............................. A63C 1/42; B32B 31/10; B32B 31/20
(52) U.S. Cl. .......................... 156/92; 156/182; 156/253; 156/267; 156/293; 156/300; 280/11.27; 280/87.042; 280/843
(58) Field of Search .............................. 156/91, 92, 153, 156/154, 182, 254, 253, 267, 293, 294, 298, 300; 280/11.19, 11.27, 87.042, 843

(56) References Cited

U.S. PATENT DOCUMENTS 4,997,196 * 3/1991 Wood ................................ 280/87.042
5,409,265 * 4/1995 Douglass ................................ 280/843

* cited by examiner

Primary Examiner—Sam Chuan Yao
(74) Attorney, Agent, or Firm—Charles C. Logan, II

(57) ABSTRACT

A skateboard deck and a method of making the same. The initial stage of making the skateboard deck comprises the step of stacking multiple veneer layers of wood upon each other and applying a coat of glue between each layer and then pressing the layers in a hydraulic press to form a first block of wood. Next the outline shape of the skateboard deck is formed on a CNC shaper machine. Following this two sets of four bore holes are machined in the first block of wood and they are counterbored on the initial top surface of the skateboard deck. Truck mounting inserts are then pressed into the bore holes in the initial top surface of the skateboard deck. One or more veneer layers of wood are then stacked onto the initial top surface of the skateboard deck and a coating of glue is applied between each layer and they are pressed together in a hydraulic press to form a second block of wood. The second block of wood is trimmed to the same shape programmed previously. A pair of trucks having wheels on them is then fastened to the bottom surface of a skateboard deck. The top surface of the skateboard deck remains free of any fastener structure.

6 Claims, 2 Drawing Sheets

METHOD OF MAKING SKATEBOARD DECK

BACKGROUND OF THE INVENTION

The invention relates to skateboards and more specifically to a novel skateboard deck that has been designed to eliminate mechanical fastener structure from its top surface when the truck assemblies have been attached thereto.

The history of skateboards goes back 40 or more years and they have always had truck assemblies attached to their bottom surface. The structure during this period of time has required the fasteners to pass downwardly from the top surface of the skateboard deck and into the structure of the truck assembly. As a final assembled skateboard, there has always been a portion of the mechanical fasteners extending upwardly from the top surface of the skateboard deck.

It is an object of the invention to provide a novel method for manufacturing a skateboard deck with truck mounting inserts therein.

It is also an object of the invention to provide a novel skateboard deck that eliminates any truck fasteners on its top surface.

It is another object of the invention to provide a novel truck mounting insert.

It is an additional object of the invention to provide novel skateboard deck that is economical to manufacture and market.

It is a further object of the invention to provide a novel skateboard deck that can have the skateboard trucks quickly and easily installed or removed.

SUMMARY OF THE INVENTION

The novel skateboard deck and the method of making the same has been designed to eliminate any mechanical fastening structure on the top surface of the skateboard deck. This is accomplished by making the skateboard deck in two distinct stages. During the first stage a plurality of veneer layers of wood are stacked upon each other and a coating of glue is applied between each layer. This stack is then placed in a hydraulic press to form a first block of wood. Next, the first block of wood is positioned in a CNC shaper machine that forms the outline shape of a skateboard deck. Next two sets of four bore holes are drilled completely through the first block of wood. The top end of these bore holes are counter-bored on the initial top surface of the skateboard deck. The truck mounting inserts are then pressed into the bore holes from the initial top surface of the skateboard deck.

The next step involves stacking one or more veneer layers of wood onto the initial top surface of the skateboard deck and applying a coating of glue between each layer. This combined structure is then reinserted in the hydraulic press to form a second block of wood for the second stage in forming the skateboard deck. The second block of wood is then returned to the CNC (computer numerical control) shaper machine for trimming the second block of wood to the same shape as programmed originally. The skateboard deck is then sanded and finished as a regular skateboard. Following this step the two trucks would be installed on the bottom of the skateboard deck using screws that are threaded into the mounting inserts.

DESCRIPTION OF THE PREFERRED EMBODIMENT

The novel skateboard deck and method of making the same will now be described by referring to FIGS. 1–9 of the drawings. The skateboard is generally designated numeral 20. It has a skateboard deck 22 having a kicktail 24. A pair of truck assemblies 26 are fastener to the underside of skateboard deck 22.

Figure 1:
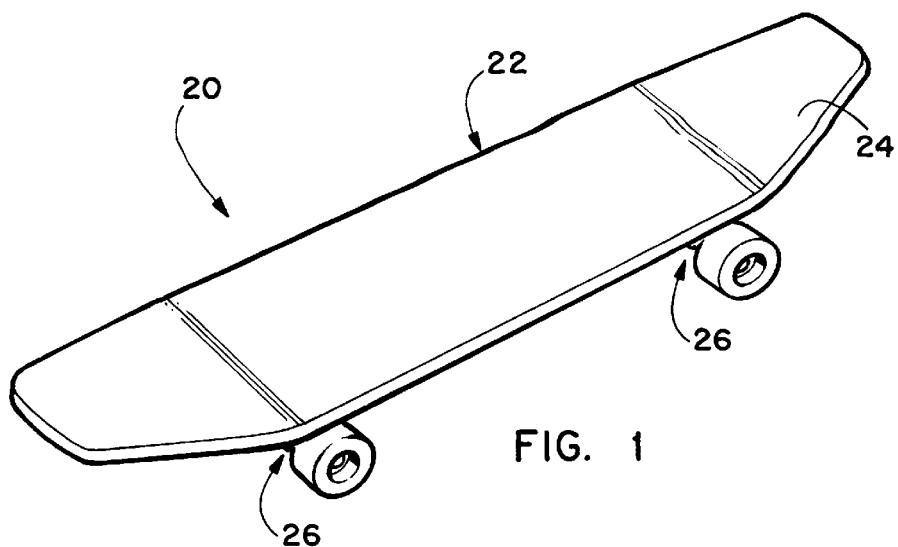
FIG. 1 is a front perspective view of the novel skateboard deck with the truck assemblies mounted thereto.
Figure 2:
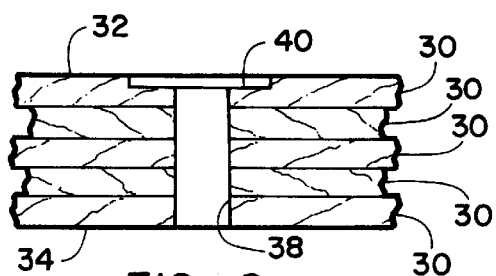
FIG. 2 is a partial cross-sectional elevation view illustrating the bore holes that are drilled into the initial assembled structure of the skateboard deck.
Figure 3:
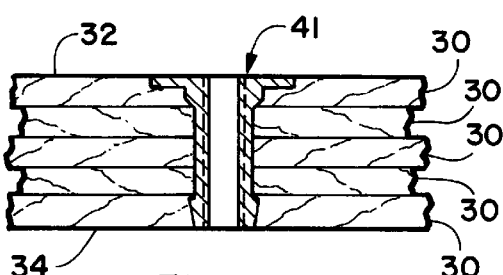
FIG. 3 is a cross sectional view similar to FIG. 2 but showing the truck mounting inserts installed therein.
Figure 4:
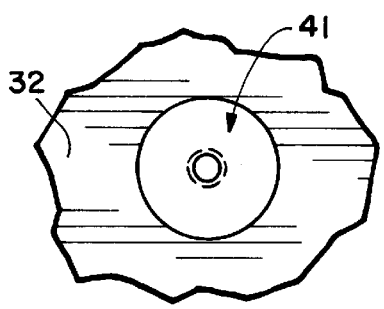
FIG. 4 is a top plan view of the structure illustrated in FIG. 3.

FIGS. 2–5 illustrated the structure of the skateboard deck during different stages of its manufacture. In FIG. 2, a plurality of veneer layers of wood have been stacked upon each other and a coating of glue has been applied between each layer, they are then pressed together in a hydraulic press to form the structure illustrated in FIG. 2. This produces a first block of wood having an initial top surface 32 and a bottom surface 34. The outline shape of skateboard deck is then formed on the first block of wood in a CNC shaper machine. Following this a plurality of bore holes 38 having a counter bore 40 at their top end are drilled through the first block of wood. In FIG. 3 the truck mounting inserts 41 have been pressed into the initial top surface 32 of the first block of wood formed. FIG. 4 is a top plan view of FIG. 3.

Figure 5:
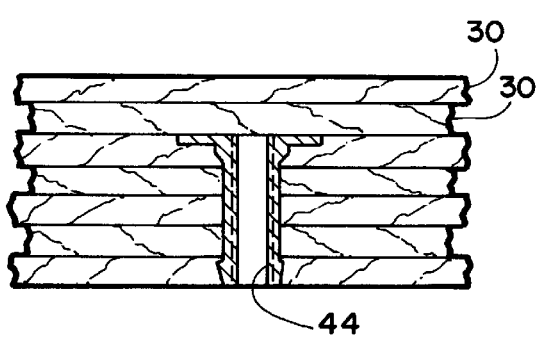
FIG. 5 is a partial cross sectional elevation view of the skateboard deck in its assembled second stage.

In FIG. 5, two more veneer layers of wood have been stacked upon each other and also upon the initial top surface 32. A coating of glue has been applied between each of the layers and the resulting structure has been thus pressed together in a hydraulic press to form a second block of wood. This second block is then trimmed to the same shape as programmed previously to form the outline shape of the skateboard deck.

Figure 6:
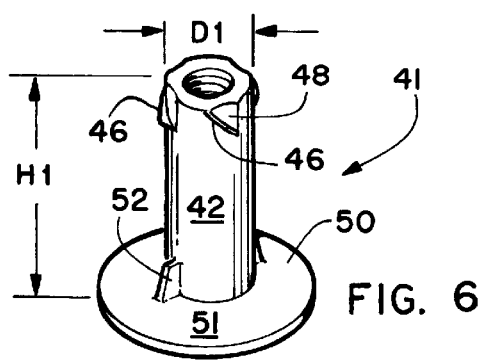
FIG. 6 is a front perspective view of one of the truck mounting inserts.
Figure 7:
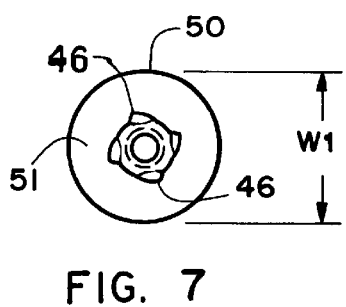
FIG. 7 is a top plan view of the truck mounting insert illustrated in FIG. 6.

The truck mounting inserts 41 are illustrated in FIGS. 6 and 7. They have a cylindrical barrel portion 42 having a height H1 and a diameter D1. A threaded bore 44 is formed in the top end of cylindrical barrel portion 42. A plurality of barbs 46 have been formed on the outer surface of cylindrical barrel portion 42 from its outer surface to form relieved areas 48. H1 is in the range of ⅛–1 inch and D1 is in the range of ⅛–¼ inch. The disk-shaped base 50 is integrally formed on the bottom end of cylindrical barrel portion 42. Disk shaped base 50 has a top surface 51 with strengthening web portions 52 connected to opposite sides of cylindrical barrel portion 42. W1 is in the range of ½–1 inch.

Figure 8:
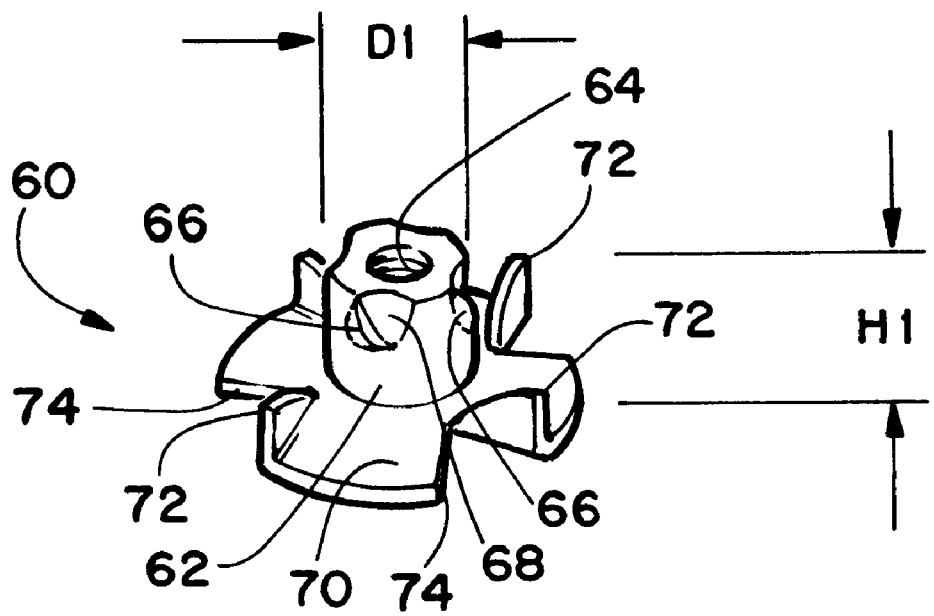
FIG. 8 is a front perspective view of an alternative embodiment of the truck mounting insert.
Figure 9:
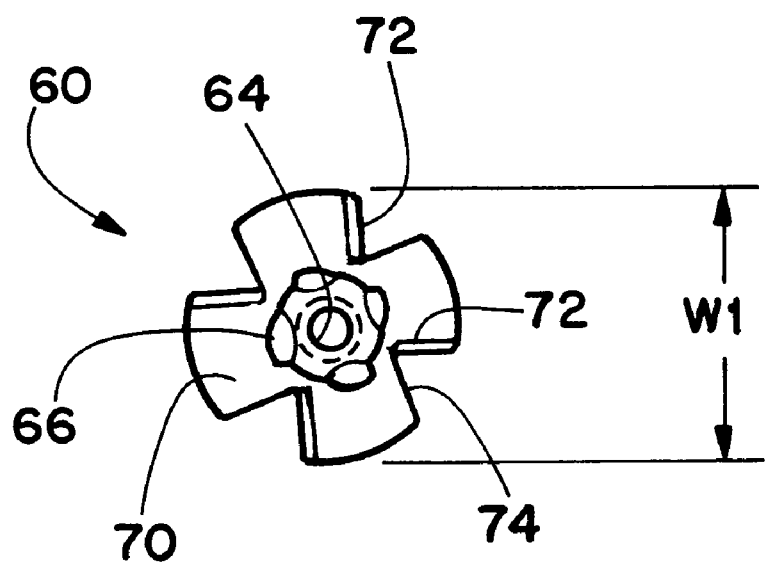
FIG. 9 is a top plan view of the alternative embodiment truck mounting insert illustrated in FIG. 8.

An alternative embodiment of the truck mounting insert is illustrated in FIGS. 8 and 9 and they are identified by numeral 60. It has a cylindrical barrel portion 62 having a threaded bore 64 in its top end. A plurality of barbs 66 are formed on the outer surface of cylindrical barrel portion 62 and they form relieved areas 68. A disk-shaped space 70 is integrally formed on the bottom end of cylindrical barrel portion 62. It has a top surface and extending upwardly therefrom are a plurality of tooth-shaped barbs 72 that form recesses 74 in the outer peripheral edge of disk-shaped base 70.

The truck assemblies 26 are secured to the bottom surface of skateboard deck 22 by screws that pass through the truck assemblies and then into the bottom ends of the respective truck mounting inserts 41 or 60. The finished skateboard deck thus has no mechanical fasteners appearing on its top surface.

What is claimed:

1. A method of making a skateboard deck comprising the following steps:

(a) stacking at least three veneer layers of wood on each other and applying a coating of glue between each layer and then pressing the layers in a hydraulic press to form a first block of wood;

(b) forming an outline shape of a skateboard deck in said first block of wood on a CNC shaper machine;

(c) CNC machining two sets of four bore holes through said first block of wood and counter boring them on the initial top surface of said skateboard deck;

(d) pressing truck mounting inserts into said bore holes from said initial said top surface of said skateboard deck;

(e) stacking at least one veneer layer of wood onto said initial top surface of said skateboard deck and applying a coating of glue between each layer and then pressing the layers in a hydraulic press to form a second block of wood;

(f) trimming said second block of wood to the same shape as programmed in step (b); and (g) sanding said skateboard deck to form an regular skateboard.

2. A method of making a skateboard as recited in claim 1 wherein five veneer layers of wood are used in step (a) and two veneer layers used in step (e).

3. A method of making a skateboard as recited in claim 1 wherein said truck mounting inserts each comprises:

a metal cylindrical barrel having a top end, a bottom end, a height H1, a diameter D1, an outer surface and a threaded bore hole in said top end; a plurality of helically shaped barbs extend outwardly from said outer surface of said cylindrical barrel;

a disk is connected to said bottom end of said cylindrical barrel; said disk having a top surface and a width W1; a plurality of tooth shaped barbs extend upwardly from said top surface of said disk.

4. A method of making a skateboard as recited in claim 3 wherein H1 is the range of ⅛–1 inch; D1 is in the range of ⅛–¼ inch, and W1 is in the range of ½–1 inch.

5. A method of making a skateboard as recited in claim 1 further comprising the step of:

fastening a pair of trucks having wheels on to said bottom surface of said skateboard deck by screws inserted into said truck mounting inserts.

6. A method of making a skateboard as recited in claim 5 wherein said truck mounting inserts each comprises:

a metal cylindrical barrel having a top end, a bottom end, a height H1, a diameter D1, an outer surface and a threaded bore hole in said top end; a plurality of helically shaped barbs extend outwardly from said outer surface from said outer surface of cylindrical barrel;

a disk is connected to said bottom end of said cylindrical barrel; said disk having a top surface and a width W1; a plurality of tooth shaped barbs extend upwardly from said top surface of said disk.

* * * * *